Sept. 12, 1933.  W. NELSON  1,926,211
EXPANSIBLE WHEEL
Filed April 26, 1928   2 Sheets-Sheet 1
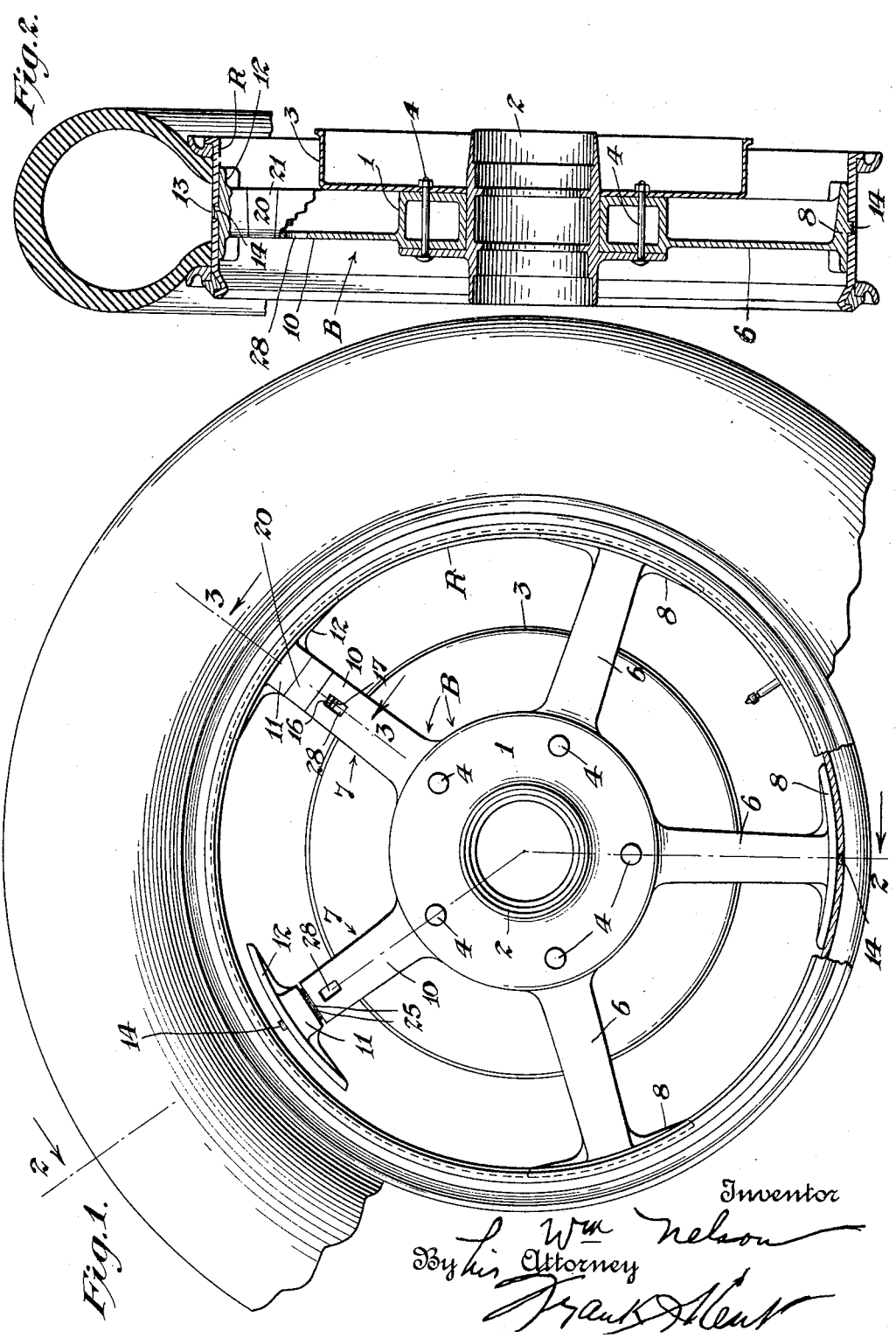

Sept. 12, 1933.  W. NELSON  1,926,211
EXPANSIBLE WHEEL
Filed April 26, 1928   2 Sheets-Sheet 2
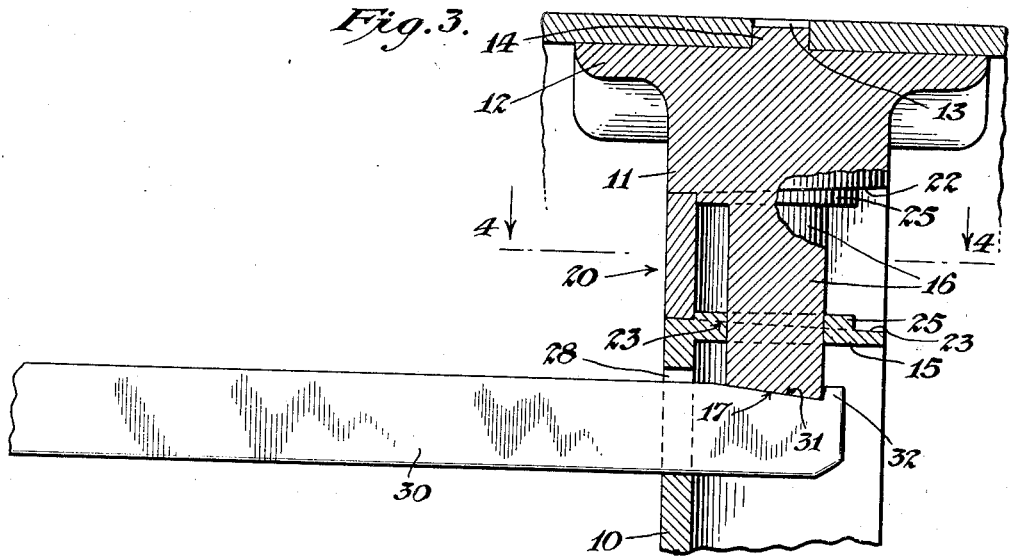
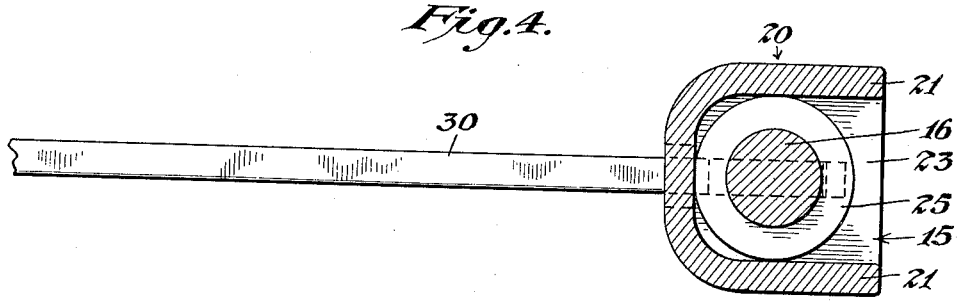
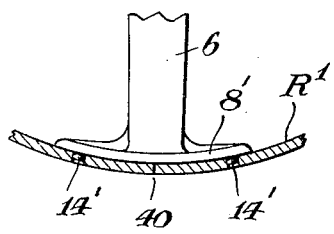
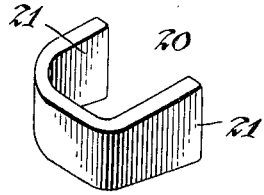
Wm Nelson Inventor
By his Attorney
Frank J Kent Patented Sept. 12, 1933

1,926,211

UNITED STATES PATENT OFFICE 1,926,211

EXPANSIBLE WHEEL

William Nelson, Minneapolis, Minn., assignor to Burnett Walker, New York, N. Y.

Application April 26, 1928. Serial No. 272,872

4 Claims. (Cl. 301—12)

My invention relates to wheels including demountable tire-rims, generally used in motor vehicles, but not necessarily limited to such uses.

The principal object is to provide a wheel body with fixed or non-extensible, and also with radially-extensible, spokes of novel character, including removable segments or retainers, together with a tire carrying rim cooperating with felly sections, or rim supports on the spokes in such manner as to securely fasten the rim in centered or offset relation to the plane of the wheel body, and to provide positive driving connection between the rim and body.

Additional characteristic and distinctive features are the provision of a structure or arrangement by which extension and retraction of the expansible spokes, and insertion and removal of the spacers or retainers therein, are accomplished by moderate expansion or "overstretching" of the tire rim, within permissible limits, by the use of a suitable lever tool, and retention of all parts in proper positions, after application of the demountable rim, by the natural resilient contraction of the latter.

The invention thus provides for application of a demountable rim by lengthwise movement of extensible spokes, as distinguished from the previous common practice of application, and comparatively indefinite seating of the rim by movement parallel to the wheel axis, and there retaining it by laterally acting clamps. While it has heretofore been proposed to secure contraction and expansion of a wheel body by providing it with screw spokes, such constructions involve exposed threads which are subject to corrosion, fail to provide sufficiently definite seating of the rim, or positive driving connection between the rim and wheel proper, or have other disadvantages understood by persons skilled in the art.

The invention is especially well adapted to embodiment in metal (usually steel) wheels, but may be adapted to part-wood wheels in some cases. The following description of a steel structure will sufficiently explain the characteristics and advantages of the invention, and enable skilled persons to understand that many variations may be made; and I contemplate the employment of any structures that are properly within the scope of the appended claims.

In the drawings:

Fig. 1 is a side elevation of a wheel embodying the invention in one form.

Fig. 2 is a section at 2—2, Fig. 1.

Fig. 3 is a sectional detail, enlarged, at 3—3, Fig. 1.

Fig. 4 is a section at 4—4, Fig. 3.

Fig. 5 is a perspective view of one of the spoke filler-pieces, spacers or retainers.

Fig. 6 is a fragmentary detail of a modification.

The novel wheel structure comprises as essential principal parts the wheel body B and the demountable or tire carrying rim R. The body includes a central portion 1, or hub of the wheel body, which may as shown be a hollow annulus. To this the usual hub structures, such as a flanged sleeve 2, and also when desired a brake drum 3, may be secured in any suitable way, as by bolts 4. The spokes may be integral with the wheel center 1, or separate, and secured together or attached thereto in any known or suitable way. In the present instance the spokes (or inward portions of the adjustable spokes) are integral with the central portion or hub 1 of the wheel body.

A series, consisting of any suitable plurality, of regularly-spaced "fixed" or non-extensible spokes 6 radiate from the hub or central body 1, and a suitable plurality of adjacent adjustable or extensible spokes 7 also extend from the central body, their spacing being the same as that of the fixed spokes, and the number of fixed spokes usually being about half the total number of spokes, or specifically as here shown one more than half the total number; so that in a five-spoked wheel there are three fixed and two extensible spokes. At their ends the fixed spokes have arcuate rim supports or bases 8. The cross-sectional shape of the spokes may vary greatly, one convenient form being a channel section, as shown.

Each extensible or adjustable spoke includes an inner rigid or fixed portion 10 and an outer adjustable or movable portion 11, carrying a segmental arcuate rim support or base 12. For the adjustable spokes these segments or rim supports are discontinuous.

The demountable or tire-carrying rim R may be of any known or suitable type adapted for clincher or straight side tire shoes. The rim is provided with sockets 13 to receive lugs or studs 14 formed on the outer faces of the rim bases 12 and one of the fixed rim bases 8, this usually being the one opposite the center of the series of adjustable spokes, as well explained in Fig. 1.

The fixed portion 10 of each adjustable spoke has an end wall 15 apertured to receive a stem or shank 16 projecting inward from the center of the movable section 11. The inward end of this stem is desirably beveled as at 17.

To cooperate with the fixed and movable parts of each adjustable spoke, a spacer, filler piece or retainer 20, Fig. 5, is provided, this being in the present instance of U-shape to correspond with the channel section of the spoke, and having the edges of its sides 21 angularly disposed so that as viewed from a side of the spoke (or as in Fig. 2), this retainer is of wedge form. Otherwise retention of the retainers may be provided for by any suitable interlocking formations on retainer 20 and the walls engaged by it. The outer face of wall 15 and also the inner wall of the body 11 of the movable spoke section may have bosses or projections 25 fitting within the contour of the retainer to prevent lateral displacement thereof.

An aperture 28 is provided in the outer face of each fixed portion 10 of the adjustable spokes, near the end thereof, for the insertion of the end of a lever-tool 30, Figs. 3 and 4, which preferably has near one end a beveled edge face 31 to cooperate with the beveled end 17 of stem 16, and a claw 32 to prevent accidental outward displacement of the lever.

To apply the remountable rim, the retainers or spacers 20 are removed and the outer sections 11 of the adjustable spokes are moved inward as illustrated by the left-hand spoke 7 in Fig. 1; the rim is then moved into the general plane of the wheel body, lug 14 of one of the fixed-spoke rim-supporting segments 8 is inserted in the appropriate socket 13 of the rim, and the movable supporting segments 12 are moved outward into contact with the rim, while their lugs 14 are inserted in the appropriate rim sockets 13. The tool is then applied in the manner indicated in Fig. 3 to successive adjustable spokes to move their extensible sections outward sufficiently for insertion of the spacers 20. The tool evidently produces a powerful leverage action, fulcruming on the inner face of the spoke aperture 28 and acting on the inner end of stem 16 to force the adjustable section outward, the wheel rim being in this way sprung, distorted or expanded resiliently sufficiently to permit the larger end portions of the wedge-like walls of the spacer to be inserted between the complemental faces of the fixed and movable spoke sections, or in other words to be positioned as shown in Figs. 1, 2 and 3; and thereupon the pressure of the tool is relaxed and the rim returns naturally and resiliently to circular form and retains the parts of the adjustable spokes in firm contact with the rim, tightly secured in a substantially centered plane in relation to the wheel body and also locked against relative rotation. The resilient contraction of the rim is augmented by the natural contractile force of an inflated tire thereon. To remove the rim the tool is applied in the same manner, the rim is sprung or expanded, and the spacers 20 are successively removed, whereupon the rim may be taken from the wheel body and another one applied.

Obviously, any other suitable leverage arrangement can be used to press outwardly the ends of the movable spokes.

Fig. 6 shows provision for a split rim $R^1$ having ends abutting at 40, this provision consisting in two lugs 14' provided at different points on one of the rim segments or supports such as 8', these lugs engaging in sockets in the respective end portions of the split rim, to prevent any separation thereof and to properly transmit the driving torque.

I claim:

1. In a wheel having a radially deformable rim, an extensible spoke including a fixed inner member and a movable outer member having a shank telescopically connected with the inner member, said outer member having its outer end in engagement with the rim, and a U-shaped spacer block straddling said shank, the contacting faces of the block and spoke sections interlocking in normal position of the rim against withdrawal of the block.

2. In a wheel having a radially deformable rim, an extensible spoke consisting of a pair of telescopically connected members having opposed walls at the telescopic part, and a spacer block straddling the male portion of the telescopic connection and having opposed faces engaging said walls, said faces and walls interlocking against removal in normal position of the rim.

3. In a wheel having a radially deformable rim, an extensible spoke consisting of a pair of telescopically connected members having opposed walls at the telescopic part, and a spacer block U-shaped in cross section and straddling the male portion of the telescopic connection, said block having opposed faces engaging said walls, the block having said opposed faces arranged in planes diverging from the arcuate portion of the U to the extremities of its arms and the opposed walls being correspondingly shaped.

4. In a wheel having a radially deformable rim, an extensible spoke including a fixed inner member and a movable outer member supporting the rim on its outer end, the said fixed inner member being adapted to receive a fulcrum lever for pressing the movable outer member outwardly to deform the rim beyond its normal diameter at the end of said spoke, and a unitary spacer block insertable laterally between the spoke sections when the movable member is in its outer position, the parts being so arranged that the spacer block is held in place solely by the resilience of the rim when the parts are in final assembled position.

WILLIAM NELSON.